United States Patent
Wang et al.

(10) Patent No.: US 8,730,432 B2
(45) Date of Patent: May 20, 2014

(54) OPTICAL FILM AND METHOD FOR MANUFACTURING THE SAME AND LIQUID CRYSTAL DISPLAY DEVICE USING THE SAME

(75) Inventors: Tzu-Chang Wang, Chu-Nan (TW); Li-Wei Mao, Chu-Nan (TW); Hsin-Wen Chang, Chu-Nan (TW); Yen-Liang Chen, Chu-Nan (TW)

(73) Assignees: Innocom Technology (Shenzhen) Co. Ltd., Shenzhen (CN); Chimei Innolux Corporation, Chu-Nan (TW)

( * ) Notice: Subject to any disclaimer, the term of this patent is extended or adjusted under 35 U.S.C. 154(b) by 27 days.

(21) Appl. No.: 13/483,348

(22) Filed: May 30, 2012

(65) Prior Publication Data

US 2012/0307180 A1    Dec. 6, 2012

(30) Foreign Application Priority Data

Jun. 3, 2011   (TW) .............................. 100119516 A
Mar. 30, 2012  (TW) .............................. 101111265 A

(51) Int. Cl.
  *G02F 1/1335*   (2006.01)
  *G02F 1/13*     (2006.01)

(52) U.S. Cl.
  CPC .................................... *G02F 1/13* (2013.01)
  USPC ............................................. 349/64; 349/58

(58) Field of Classification Search
  CPC .................................. G02F 1/1335; G02F 1/13
  USPC ..................................................... 349/58, 64
  See application file for complete search history.

(56) References Cited

U.S. PATENT DOCUMENTS

| | | | |
|---|---|---|---|
| 5,521,725 A | 5/1996 | Beeson et al. | |
| 6,049,649 A | 4/2000 | Arai | |
| 6,222,689 B1 | 4/2001 | Higuchi et al. | |
| 7,721,616 B2 | 5/2010 | Augustine et al. | |
| 8,253,329 B2 * | 8/2012 | Kostka et al. | 313/512 |
| 2001/0008437 A1 * | 7/2001 | Fujimori et al. | 349/113 |
| 2002/0113937 A1 * | 8/2002 | Ouderkirk et al. | 349/187 |
| 2003/0058388 A1 * | 3/2003 | Nakayoshi et al. | 349/113 |
| 2009/0122576 A1 * | 5/2009 | Sato et al. | 362/620 |
| 2009/0135490 A1 | 5/2009 | Lee et al. | |
| 2011/0175523 A1 * | 7/2011 | Kostka et al. | 313/512 |

FOREIGN PATENT DOCUMENTS

| | | |
|---|---|---|
| CN | 1601347 | 3/2005 |
| CN | 1982918 | 6/2007 |
| CN | 101178506 | 5/2008 |
| CN | 101592754 | 12/2009 |
| CN | 101609174 | 12/2009 |
| CN | 101819289 | 9/2010 |
| JP | 2007304460 | 11/2007 |
| TW | 200825560 | 6/2008 |
| TW | 200848800 | 12/2008 |

(Continued)

*Primary Examiner* — Lucy Chien
(74) *Attorney, Agent, or Firm* — Liu & Liu

(57) ABSTRACT

An optical film is provided. The optical film includes a substrate, a first transmission medium, second transmission medium, and a reflective polarizing film. The first transmission medium is disposed at the front surface of the substrate and includes a plurality of embossed microlenses. The second transmission medium is disposed at the rear surface of the substrate and comprises a plurality of V-shaped prisms. The reflective polarizing film is disposed at the front surface of the first transmission medium. The substrate, the first transmission medium, and the second transmission medium are bounded to each other to form a unitary sheet.

13 Claims, 14 Drawing Sheets

(56) References Cited

FOREIGN PATENT DOCUMENTS

| | | |
|---|---|---|
| TW | M346016 | 12/2008 |
| TW | 200903034 | 1/2009 |
| WO | 2009151217 | 12/2009 |

\* cited by examiner

OPTICAL FILM AND METHOD FOR MANUFACTURING THE SAME AND LIQUID CRYSTAL DISPLAY DEVICE USING THE SAME

CROSS REFERENCE TO RELATED APPLICATIONS

This Application claims priority of Taiwan Patent Application No. 101111265, filed on Mar. 30, 2012, which claims priority of Taiwan Patent Application No. 100119516, filed on Jun. 3, 2011, the entirety of which is incorporated by reference herein.

BACKGROUND OF THE INVENTION

1. Field of the Invention

The present invention relates to a liquid crystal display device, and in particular relates to a liquid crystal display device with a unitary optical film.

2. Description of the Related Art

Liquid crystal display devices are already widely used in all kinds of electronic devices, such as LCD TVs and computers. Key advantages are low electricity consumption, low driving voltage, and the possibility of achieving lighter weight and thinner volume. However, the liquid crystal display panel in the liquid crystal display device cannot emit light by itself, and has to pair with a back light unit to light the screen evenly.

Please refer to FIG. 1. FIG. 1 shows a side view of the conventional liquid crystal display device 1 utilizing an edge-light type back light unit. The liquid crystal panel module 40 is disposed in front of the back light unit 10, wherein the back light unit comprises: a light-emitting unit 11, a light guide panel 12, a lower diffusion plate 13, a prism sheet 14, and an upper diffusion plate 15.

The light guide panel 12 guides the light beam emitted from the light-emitting unit 11 to the lower diffusion plate 13. The lower diffusion plate 13 then disperses and hazes the light beam coming from the light guide panel 12 and distributes the brightness evenly. Nevertheless, the brightness within the effective viewing angle is reduced drastically due to the lower diffusion plate 13.

In order to solve this problem, the prism sheet 14 receives the light beam that passes through the lower diffusion plate 13 and converges the emergent angle of the incident light beam to strengthen brightness within the effective viewing angle. The prism sheet 14 is a commonly sold brightness enhancement film, with a 90° apex angle, and prism sheet 14 curving towards the liquid crystal panel module 40.

Finally, the light beam is dispersed and hazed again through the upper diffusion plate 15 in order to provide a uniform light beam to the liquid crystal panel module 40 situated in front.

However, the above-mentioned back light unit needs at least three individually manufactured optical films, each requiring its own substrate material, which yield a high production cost.

Furthermore, the air layer formed between the upper diffusion plate and the prism sheet will cause a portion of the light beam to fully reflect from the prism sheet and render it unable to be projected into the upper diffusion plate. The strength of the light beam will be consumed with the increased length thus weakening the overall brightness. Conventionally, in order to increase the brightness of the back light unit it is necessary to raise the light source power of the light-emitting element, but this also means accelerated energy consumption.

In this regard, a liquid crystal display device with a unitary optical film came into high demand.

BRIEF SUMMARY OF THE INVENTION

In order to overcome the problems of the prior art of multilayer optical film, this invention provides the below-optical film and the liquid crystal display device using such optical film with the goal of reducing the number of optical films used.

As one of the objectives, this invention provides an optical film, which includes a substrate, a first transmission medium, second transmission medium, and a reflective polarizing film. The first transmission medium is disposed at the front surface of the substrate and comprises a plurality of embossed microlenses. The second transmission medium is disposed at the rear surface of the substrate and comprises a plurality of V-shaped prisms. The reflective polarizing film is disposed at the front surface of the first transmission medium. The substrate, the first transmission medium, and the second transmission medium are bounded to each other to form a unitary sheet.

Another objective of this invention is to provide a liquid crystal display device, which includes a liquid crystal panel module, a light guide panel, a light-emitting element, and the above-mentioned optical film. The light guide panel includes a light-emitting surface adjacent to the rear surface of the liquid crystal panel module, and a light incident surface with an adjacent corresponding light-emitting surface. The light-emitting element faces the light incident surface of the light guide panel. The optical film is disposed on the light-emitting surface of the light guide panel or the rear surface of the liquid crystal panel module.

Yet another objective of this invention is to provide a manufacturing method for the above-mentioned optical film, which includes providing a substrate, and coating a light curing resin on the upper and lower surface of the substrate; providing two patterned rollers, and disposing the substrate between the two patterned rollers, whereby the two patterned rollers press on the light curing resin simultaneously to produce a specific pattern on the surface of the light curing resin. Lastly, providing a light beam to cure the light curing resin.

The optical film of the invention is a unitary sheet, not only reducing cost, but also improving the deficiencies found in the multilayer optical film of the prior art.

BRIEF DESCRIPTION OF THE DIAGRAMS

The present invention can be more fully understood by reading the subsequent detailed description and examples with references made to the accompanying diagrams, wherein.

DETAILED DESCRIPTION OF THE INVENTION

The following description is one of the embodiments of the invention. This description is made for the purpose of illustrating the general principles of the invention and should not be taken in a limiting sense. The scope of the invention is best determined by reference to the appended claims.

Figure 1:
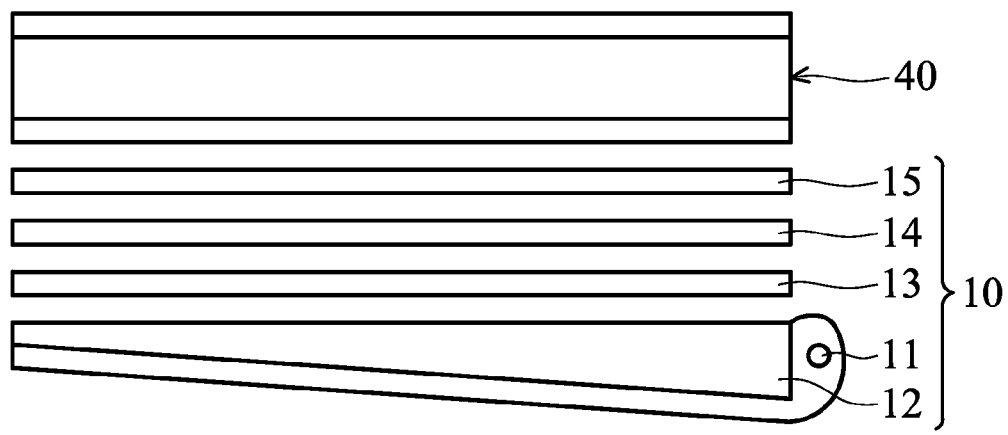
FIG. 1 shows the cross-section diagram of a conventional liquid crystal display device.
Figure 2A:
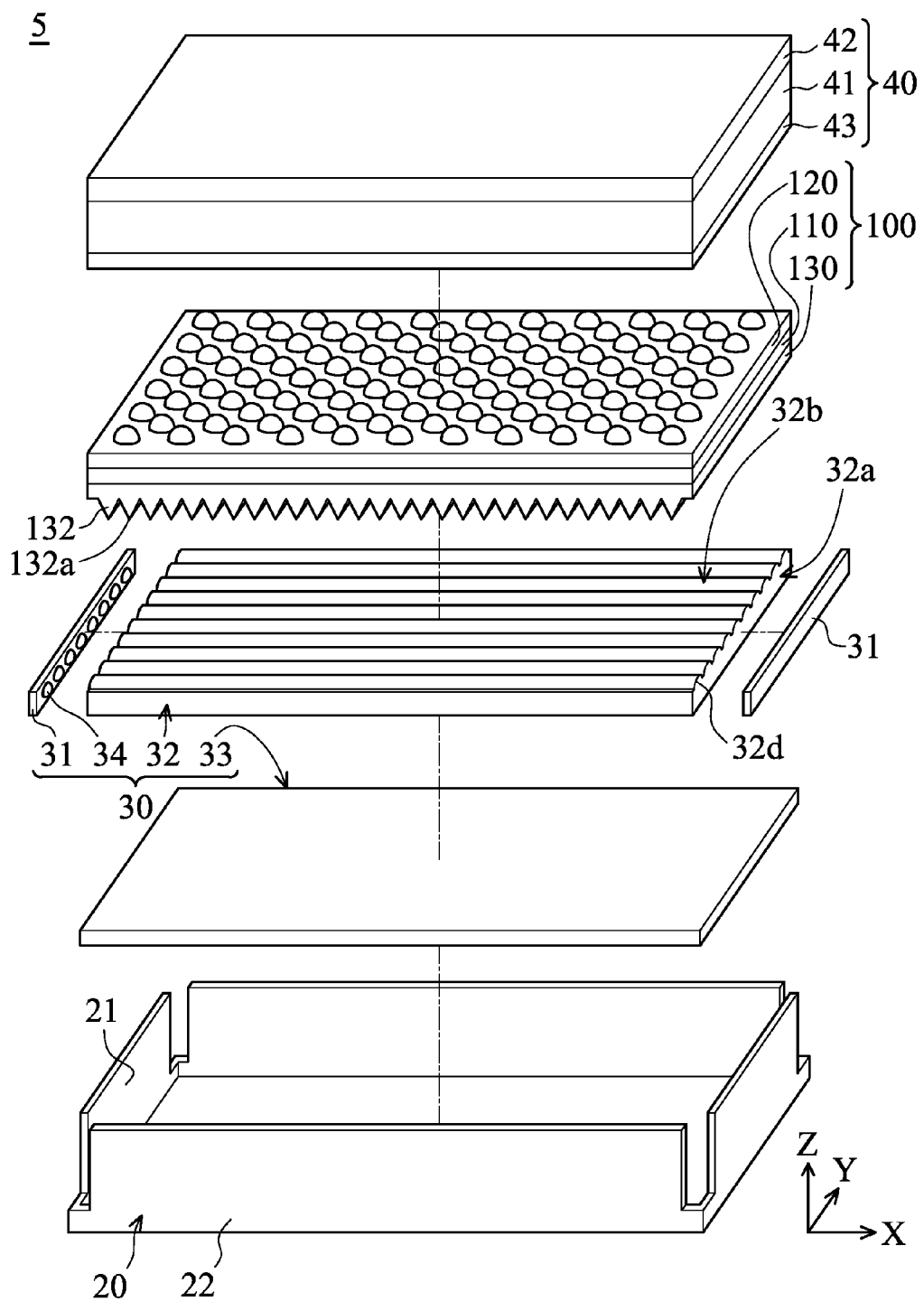
FIG. 2A shows an exploded diagram of the liquid crystal display device of the first embodiment of the invention.

Please refer to FIG. 2A. FIG. 2A shows an exploded diagram of the liquid crystal display device of the first embodiment of the invention. The liquid crystal display device 5 of the invention includes a frame 20, a back light unit 30, a liquid crystal panel module 40, and an optical film 100. It should be noted that "front surface" in this specification refers to the upper portion of the drawing, namely one side of the liquid crystal display device 5 which manifests the image, while "rear surface" refers to the lower portion of the diagram.

In one exemplary embodiment, the frame 20 is a rectangular shell, with a height to width ratio of 16:9, wherein the short side 21 is defined on the Y-axis and the long side 22 is defined on the X-axis. Normally, when the liquid crystal display device 5 of the invention is placed upright, the short side 21 is located on the left and right sides of the user, and the long side 22 is located on the top and bottom, wherein the long side 22 is parallel to a horizontal plane.

Figure 2B:
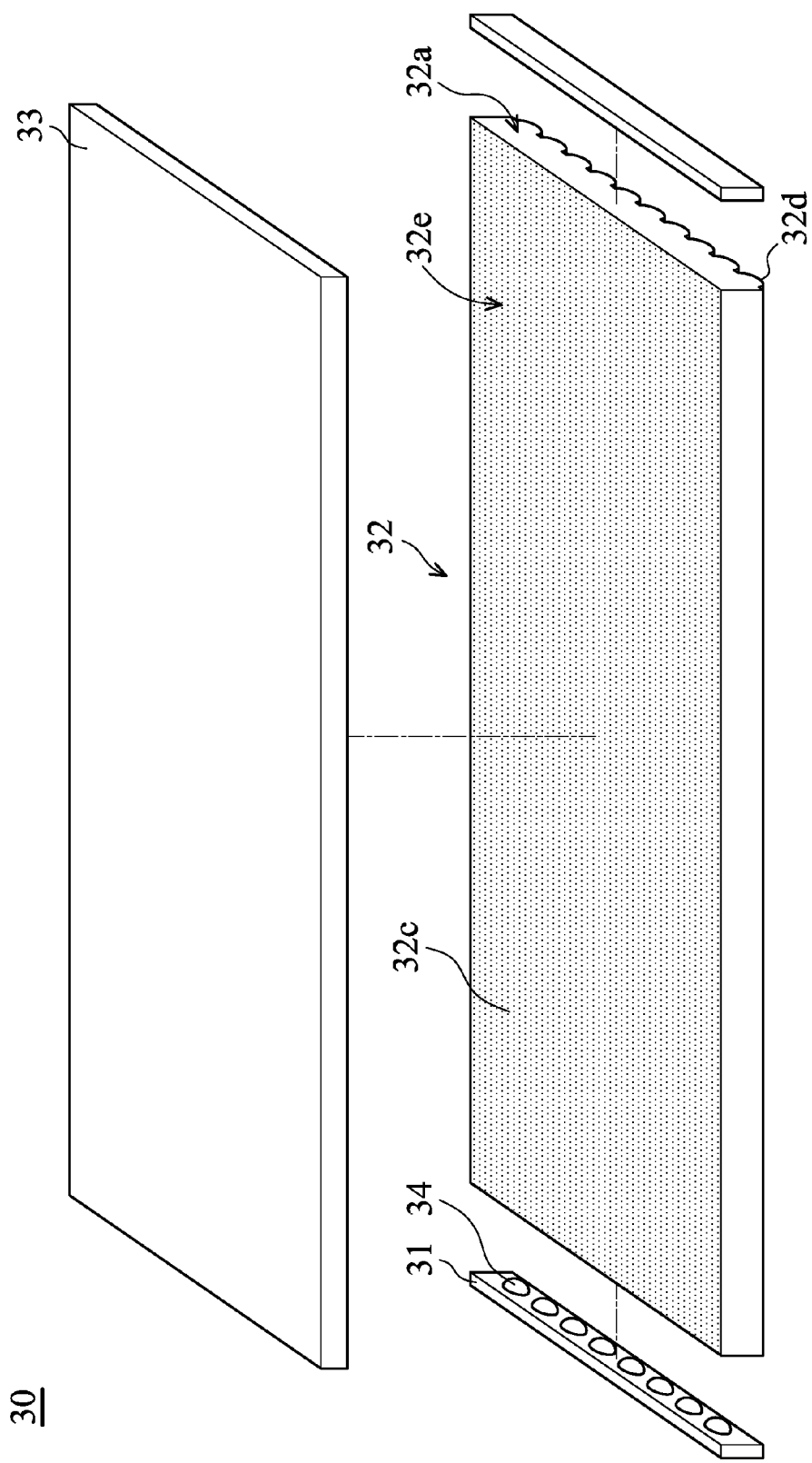
FIG. 2B shows an exploded diagram of partial elements of the liquid crystal display device of the first embodiment of the invention.

Please refer to FIGS. 2A and 2B. FIG. 2B shows an exploded diagram of the back light unit 30 of the first embodiment of the invention. The back light unit 30 is disposed inside the frame 20, and includes two light bars 31, a light guide plate 32, a reflective sheet 33, and a plurality of light-emitting elements 34. The light bars 31 are disposed in the inner surfaces of the two short sides 21 of the frame 20. The light-emitting element 34 is disposed on the light bars 31 emitting a light beam in a predetermined direction (X-axis), wherein the predetermined direction (X-axis) is parallel to the long side 22 of the frame 20. The reflective sheet 33 is disposed in the inner bottom surface of the frame 20. In one exemplary embodiment, the light bar 31 is a circuit board, the light-emitting element 34 is a light-emitting diode, and the reflective sheet 33 is made of, but not limited to, aluminum.

The light guide plate 32 is disposed on the front surface of the reflective sheet 33 and includes two light incident surfaces 32a, a light-emitting surface 32b, a bottom surface 32e, and printed dots 32c. The light incident surfaces 32a both face the light-emitting element 34 to receive the light beam from the light-emitting element 34. The light-emitting surface 32b is adjacent to the two light incident surfaces 32a, and includes a patterned surface 32d. The bottom surface 32e is opposite to the light-emitting surface 32b and is adjacent to the reflective sheet 33. The printed dots 32c are randomly spread on the bottom surface 32e.

In this embodiment, two light bars 31 are disposed on the inner surface of the short sides 21 of the frame 20 to allow both sides of the light guide plate 32 to receive a light beam incident from the light-emitting element 34 located on top of the light bars 31. Those skilled in the art can achieve the same effect by using a higher brightness light-emitting element 34 and a single light bar 31 to receive light from one side of the light guide plate 32.

In one embodiment, the patterned surface 32d is parallel to a section of the light incident surface 32a and comprises a plurality of lenticular protrusions. In further detail, the patterned surface 32d is comprised of a plurality of minute curved surfaces along the Y-axis, wherein the curved surfaces are lined adjacent to each other, the apex extending parallel to the predetermined direction (X-axis) towards which the light-emitting elements 34 emit a light beam.

It is appreciated that on the patterned surface 32d, the emergent angle of the light beam emitted from the light-emitting surface 32b is limited, so that the light is concentrated. Furthermore, the printed dots 32c can change the path the light beam traveling in the light guide plate 32 and altering the total reflection phenomenon of the light beam in order to guide the light beam to the light-emitting surface 32b. The emergent light shape of the light guide plate 32 depends on the type of printed dots 32c. In one exemplary embodiment, the printed dots 32c can be the traditionally used white ink or transparent ink, the latter being a better option for printed dots 32c as it concentrates the lights more.

Please refer to FIG. 2A. The liquid crystal panel module 40 is disposed adjacent to the light-emitting surface 32 on the light guide plate 30. The liquid crystal panel module 40 includes a liquid crystal element 41, an upper polarization plate 42, and a lower polarization plate 43. The upper polarization plate 42 is disposed on the front surface of the liquid crystal element 41, while the lower polarization plate 43 is disposed on the rear surface of the liquid crystal element 41. Since the liquid crystal panel module 40 is well within the knowledge of one skilled in the art, further elaboration will not be presented here regarding the liquid crystal panel module 40.

The optical film 100 is disposed in the light-emitting surface 32b of the light guide plate 32 comprising a substrate 110, a first transmission medium 120 and a second transmission medium 130, wherein the first transmission medium 120 is disposed in the front surface of the substrate 110, and the second transmission medium 130 is disposed in the rear surface of the substrate 110. In one exemplary embodiment, the substrate 110 is a light transmissive membrane made of polyethylene terephthalate (PET), and the first transmission medium 120 and the second transmission medium 130 are made of light curing resin, but not limited thereto.

The structural features of the optical film 100 of this invention can be modified based on the user's demands. In the description below, some exemplary possible implementation methods of the optical films 100a~100f will be illustrated.

Figure 3A:
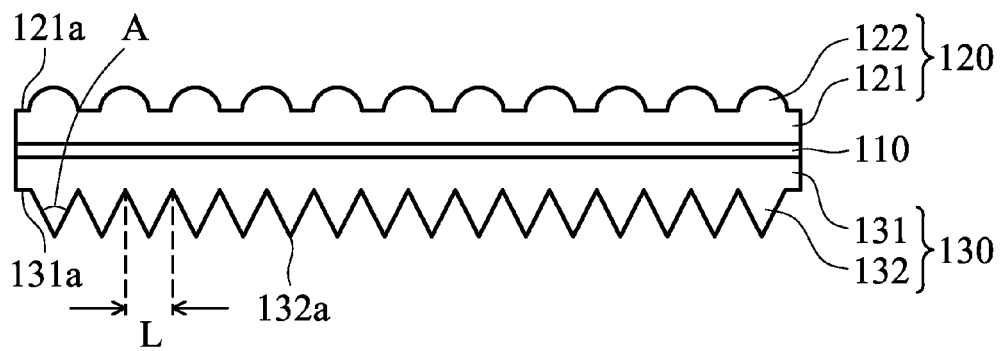
FIGS. 3A-3H shows a cross-section diagram of the optical films of the invention.

Please refer to FIG. 3A. FIG. 3A shows a cross-section diagram of the optical film 100a. The first transmission medium 120 of the optical film 100a includes a base layer 121 and a plurality of embossed microlenses 122. The base layer 121 is connected to the substrate 110 and a plurality of embossed microlenses 122 is disposed separately on a surface of the base layer 121 away from the surface 121a connecting to the substrate 110. It is appreciated the geometrical form of the embossed microlenses 122, the light beam from the back light unit 30 emerges from the optical film 100a with a better emergent angle. Specifically, the embossed microlenses 122 can not only concentrate the viewing angle of the light beam which is incident therein with a wide emergent angle, but the embossed microlenses 122 can disperse and haze the light beam incident with a near perpendicular incident angle (FIG. 2A, Z axis). Thus, the liquid crystal display device 5 can obtain a wider viewing angle.

In one exemplary embodiment, in each unit area, approximately 40% to 80% of the surface 121a of the base layer 121 is covered by the embossed microlenses 122. The bottom diameter of each of the embossed microlenses 122 is 20 μm to 100 μm, with a height 0.1 to 1 times the bottom surface diameter. However, it is not limited to this, and the viewing angle and luminosity level can be tailored to the needs of those skilled in the art.

The second transmission medium 130 of the optical film 100a comprises a base layer 131 and a plurality of V-shaped prisms 132. The base layer 131 is connected to the substrate 110, and a plurality of V-shaped prisms 132 is disposed successively on the base layer 131 away from the surface 131a that connects to the substrate 110. Every V-shaped prism 132 has an apex that extends towards the Y-axis (FIG. 2A), and a triangular profile on the X-Z plane.

In one embodiment, the apex angle A of the V-shapes prisms 132 is approximately 60°~80°, and width L is approximately 10 um~100 um. The designer can adjust the dimensions to enhance the light concentration effect in accordance with demand.

It is noted that the above-mentioned second transmission medium 130 is a brightness enhancement film different from conventional one. The difference is in the apex angle of the V-shaped prisms 132; contrary to the conventional brightness enhancement film, it does not form a right angle. The light concentrating ability of the V-shaped prisms 132 is superior to the prior art's brightness enhancement film. Furthermore, during use, the apex of the V-shapes prisms 132 is curved towards the back light unit 30 (FIG. 2A), while the apex of the conventional brightness enhancement film is reversed to the back light unit.

Through the above-mentioned optical film 100a, after the light beam is emitted from the light-emitting surface 32b of the light guide plate 32, they are first refracted and converged in the V-shaped prisms 132 of the second transmission medium 130 to increase the brightness of the visible region, then pass successively through the base layer 131, the substrate 110 and the base layer 121. Finally, it disperses and deflects on the surface of the embossed microlenses 122 of the first transmission medium 120 so as to increase the viewing angle within the visible region and improve brightness uniformity. Therefore, the optical film 100a formed by a unitary sheet can replace the conventional multilayer optical film distributing the light beam evenly to the liquid crystal display device (FIG. 2A).

Figure 3B:
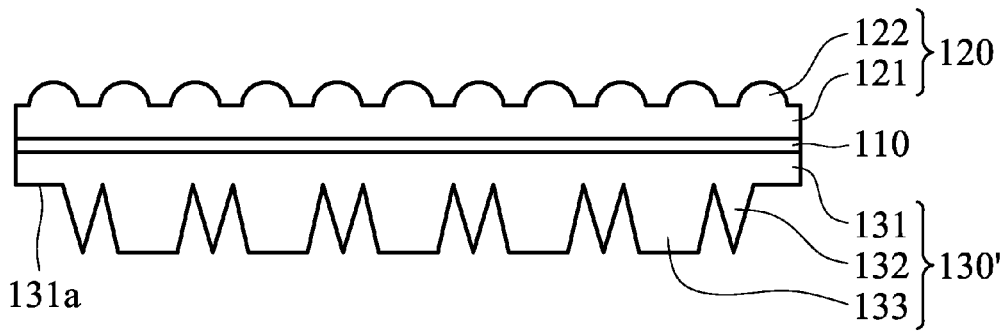

Please refer to FIG. 3B. FIG. 3B shows a cross-section diagram of another optical film 100b. Unlike the optical film 100a, the surface 131a of the second transmission medium 130 further includes a plurality of plane-convex prisms 133 disposed between the V-shaped prisms 132 adjacently and separately. The apex of the plane-convex prisms 133 is a plane to protect the apex structure of the V-shaped prisms 132 from damage. Nonetheless, the location and amount of plane-convex prisms 133 should not be limited.

Figure 3C:
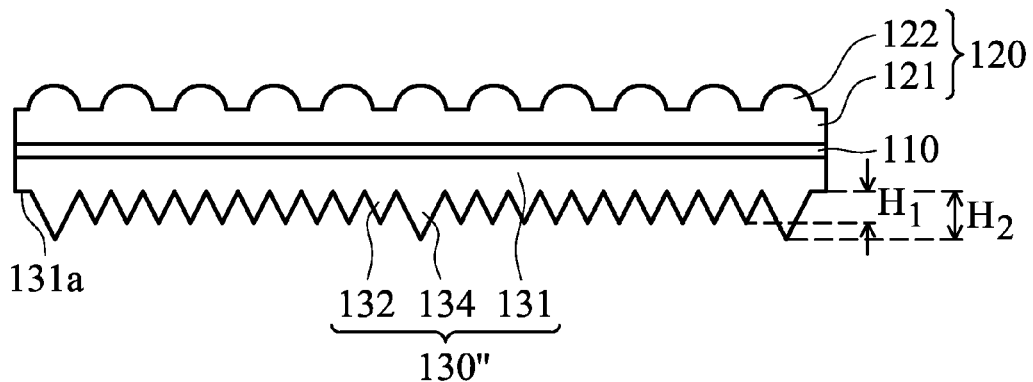

Please refer to FIG. 3C. FIG. 3C is a cross-section diagram of another optical film 100c. It differs with the optical film 100a in that the surface 131a of the second transmission medium 130" further includes a plurality of V-shaped prisms 134 with greater height. The apex height H2 of the V-shaped prisms 134 is greater than the apex height H1 of the V-shaped prisms 132 in order to maintain the distance between the V-shaped prisms 132 and the light guide plate 32 (FIG. 2A). This is to prevent the apex of the V-shaped prisms 132 from producing static electricity with the light guide plate 32, and mutually attracting one another, resulting in uneven brightness (mura phenomenon).

In one exemplary embodiment, the height difference of H2 to H1 is 2% to 10% of H1. Those skilled in the art can choose a more suitable height difference based on the numbers provided of the invention to achieve their goal.

Figure 3D:
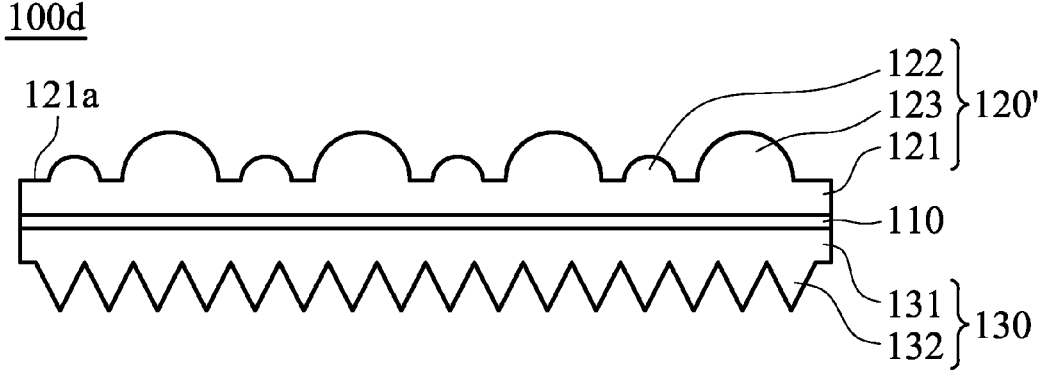

Please refer to FIG. 3D. FIG. 3D shows the cross-section diagram of another optical film 100d. It is different to the optical film 100a in that the surface 121a of the first transmission medium 120' further includes a plurality of embossed microlenses 123 with greater height in order to increase brightness uniformity discharged from the optical film 100d. In this embodiment the embossed microlenses 123 are disposed between the embossed microlenses 122 adjacently and separately, but the location it is disposed in should not be limited.

Figure 3E:
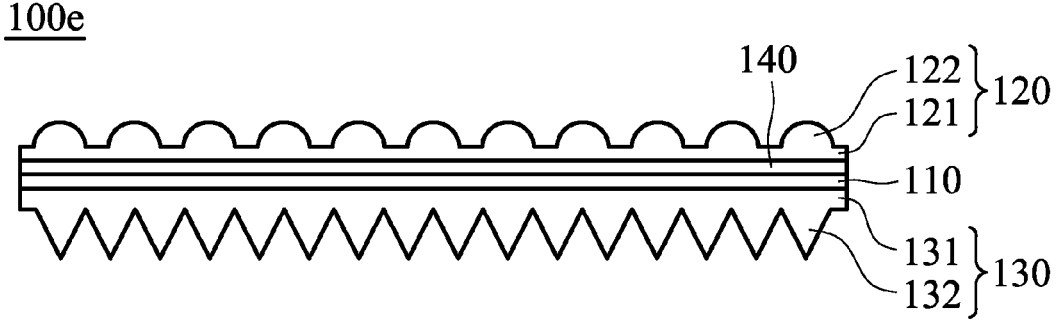

Please refer to FIG. 3E. In this embodiment the optical film 100e also includes a third transmission medium 140 disposed between the first transmission medium 120 and the second transmission medium 130. More specifically, the third transmission medium 140 is disposed between the substrate 110a and the first transmission medium 120.

The third transmission medium 140 is formed with a low refraction index material such as silica resin, or another resin with a low refraction index. Nevertheless, it should be noted that the low refractive index property referred to herein is in relation to the refractive index of the transmission medium 130; therefore, a light beam with an overly wide emergent angle will be fully reflected between the second transmission medium 130 and the third transmission medium 140. A light beam with an overly wide viewing angle then can be refracted back for reuse, thus reducing unnecessary energy consumption.

Figure 3F:
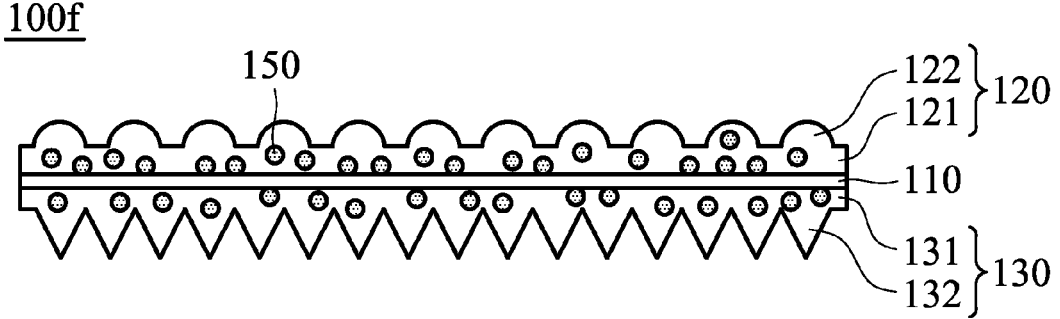

Please refer to FIG. 3F. Compared to the optical film 100a, the optical film 100f further includes a plurality of diffusion particles 150 dispersed irregularly in the first transmission medium 120 and the second transmission medium 130. The diffusion particles 150 allow the light beam to disperse, therefore improving the brightness uniformity of the optical film 100f.

Figure 3G:
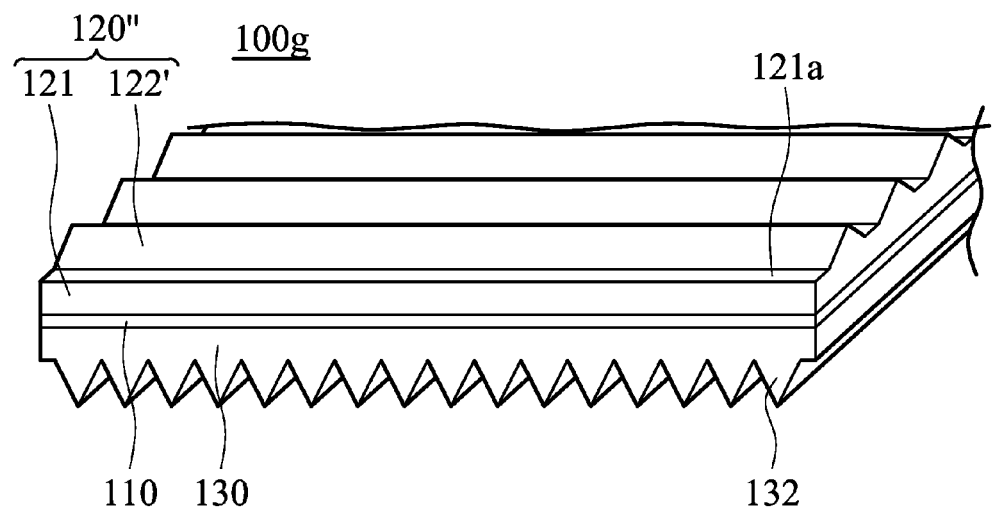

Please refer to FIG. 3G. Compared to the optical film 100a, the embossed microlenses 122' of the first transmission medium 120" of the optical film 100g include a plurality of prismatic structures, wherein the embossed microlenses 122', which are spaced apart, are formed on the surface 121a of the base layer 121 which is away from the substrate 110 and extends in a direction which is perpendicular to the extension direction of the V-shaped prisms 132. Depending on the demands, the embossed microlenses 122' can be formed adjacently. Moreover, the tops of the two adjacent prismatic structures 122' are spaced apart by a distance of about 10 μm to 100 μm.

Figure 3H:
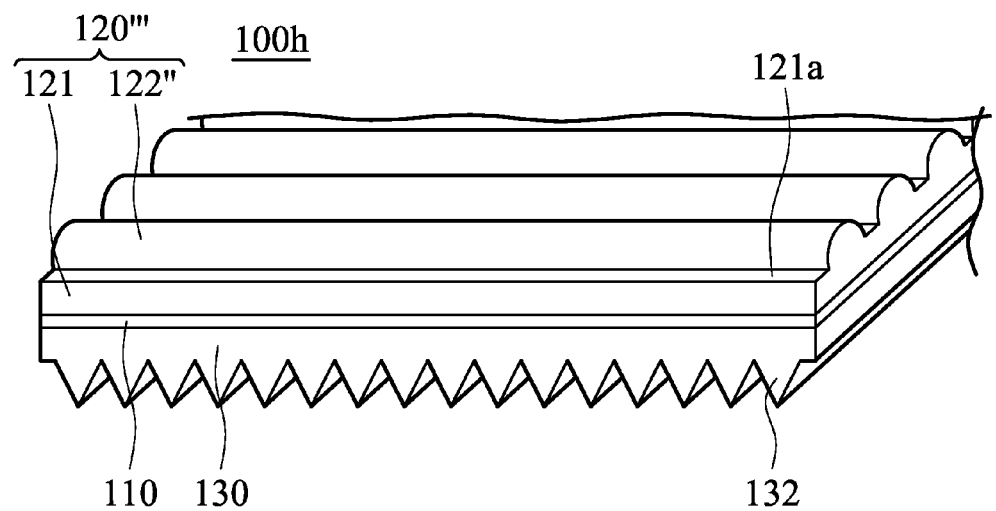

Please refer to FIG. 3H. Compared to the optical film 100a, the embossed microlenses 122" of the first transmission medium 120''' of the optical film 100h includes a plurality of lenticular structures, wherein the embossed microlenses 122", which are spaced apart, are formed on the surface 121a of the base layer 121 which is away from the substrate 110 and extends in a direction which is perpendicular to the extension direction of the V-shaped prisms 132. Depending on the demands, the embossed microlenses 122" can be formed adjacently. Moreover, the tops of the two adjacent lenticular structures 122" are spaced apart by a distance of about 10 μm to 100 μm.

The first transmission medium 120 and the second transmission medium 130 of the above-mentioned optical films 100a-100h are interchangeable to fulfill different needs. Furthermore, when manufacturing the first transmission medium 120 and the second transmission medium 130 it is unnecessary to fix the position between the embossed microlenses 122 and the V-shaped prisms 132. Specifically, on a perpendicular axis the embossed microlenses 122 can be aligned or interlaced with the V-shaped prisms 132.

It should be especially noted that the optical film 100 of the invention is a unitary sheet, which means that the substrate 110, the first transmission medium 120 and the second transmission medium 130 are bounded to each other to form a unitary sheet. To emphasize this feature, the manufacturing method of the optical film 100 will be described in the description below.

Figure 4:
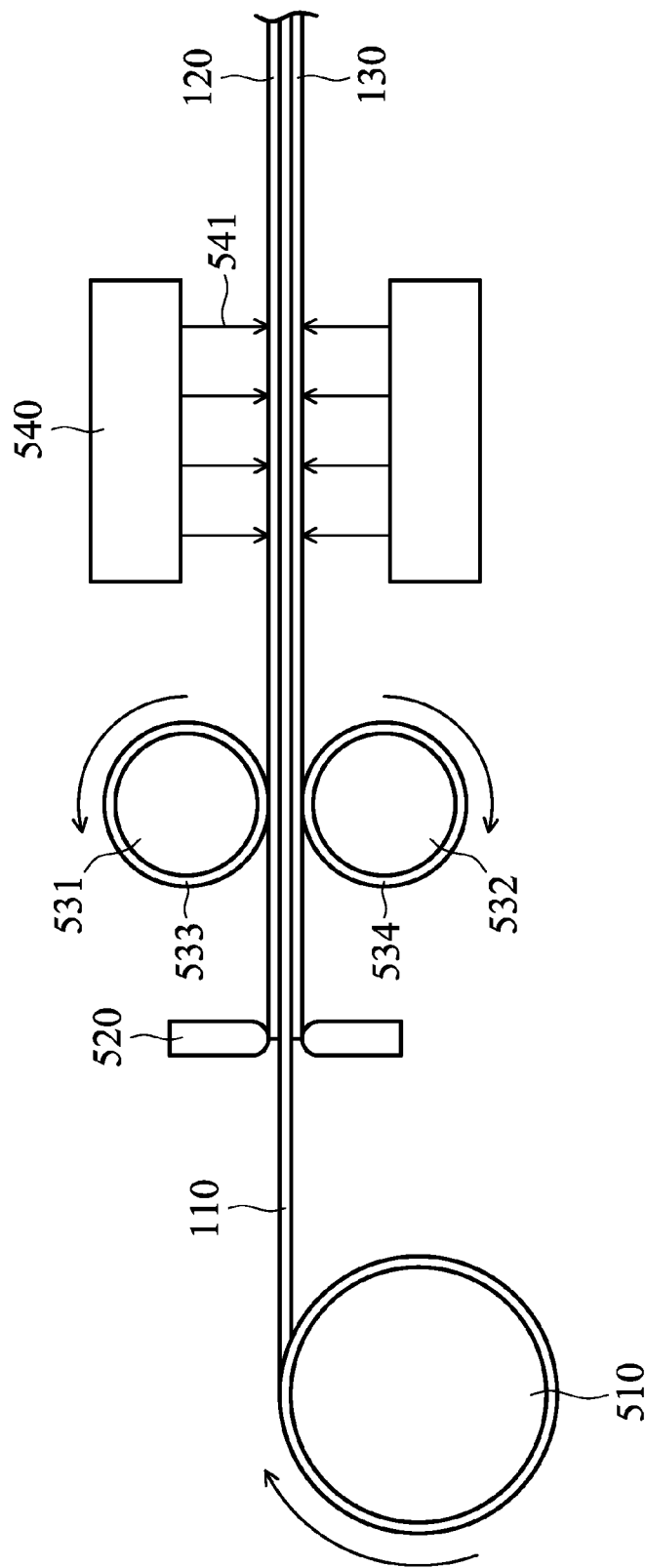
FIG. 4 is a schematic view of the manufacturing method of the optical film of the invention.

Please refer to FIG. 4. FIG. 4 is a schematic diagram of the manufacturing process of the optical film 100. Firstly, the substrate 110 is provided from the roller 510 and light curing resin is coated on the upper and rear surface of the substrate through two spray nozzles. Provided are a first patterned roller 531 and a second patterned roller 532 to dispose the substrate 110 coated with light curing resin in between. The first patterned roller 531 and the second patterned roller 532 then press simultaneously onto the upper and rear surface of the substrate 110 which is coated with light curing resin. A particular pattern will be printed on the surface of the light curing resin. Finally, the light curing resin will be cured through an ultraviolet (UV) ray 541 emitted from the machine 540, so that the substrate 110, the first transmission medium 120 and the second transmission medium 130 are bounded into a unitary sheet. The light beam emitted from the machine 540 can be infrared (IR) or another type of ray depending on the kind of light curing resin selected.

The surface of the above-mentioned first patterned roller 531 and second patterned roller 532 are covered with molds 533, 534 produced through physical etching, chemical etching or other form of engraving. The mold 533 includes a plurality of grooves (not shown) corresponding to the surface 121a of the first transmission medium 120. Likewise, the mold 534 includes a plurality of grooves (not shown) corresponding to the surface 131a of the first transmission medium 130.

Please refer again to FIG. 2A. In an overview of the liquid crystal display device 5 of the invention, in order to provide a light beam with a high uniformity of brightness for the liquid crystal panel module 40, the path of the light beam emitted by the light-emitting element 34 is along a predetermined direction (X-axis) parallel to the long side 22 of the frame 20, and the lenticular protrusions on the patterned surface 32d of the light guide 32 are also extended along the predetermined direction (X-axis) towards which the light-emitting element 34 emits the light beam. Furthermore, the apexes 132a of the V-shaped prisms 132 on the optical film 100 extend perpendicularly to the predetermined direction (X-axis) towards which the light-emitting element 34 emits the light beam.

Figure 5:
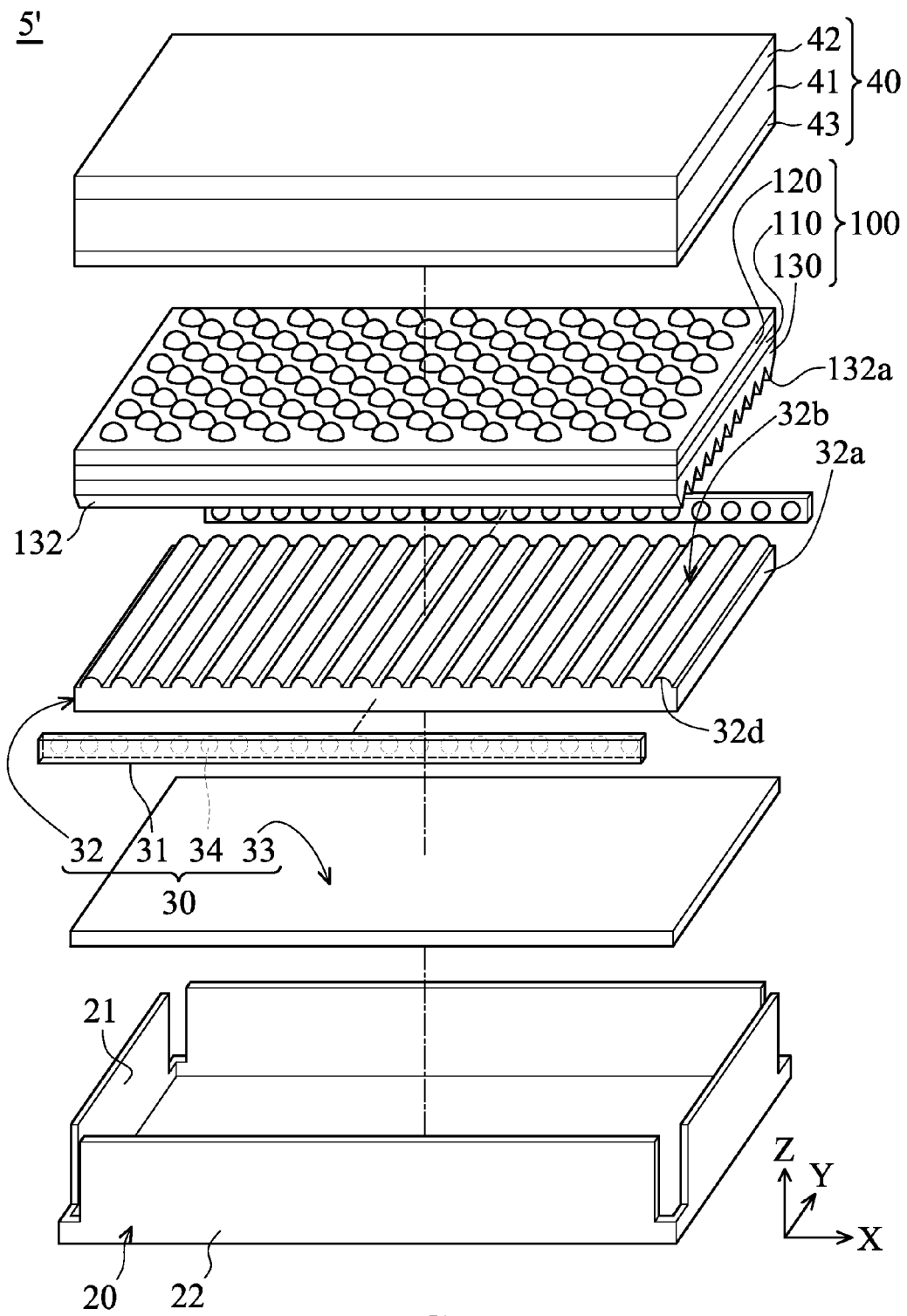
FIG. 5 shows an exploded diagram of the liquid crystal display device of the second embodiment of the invention.

Please refer to FIG. 5. FIG. 5 shows a liquid crystal display device 5' in the second embodiment of this invention. The liquid crystal display device 5' differs from the liquid crystal display device 5 by disposing the light bar 31 and light-emitting element 34 of the back light unit 30 in the inner surface of the long side 22 of the frame 20. In order to obtain graphic uniformity similar to the liquid crystal display device 5, the path of the light beam emitted by the light-emitting element 34 is along a predetermined direction (Y-axis) parallel to the short side 21 of the frame 20, and the lenticular protrusions on the patterned surface 32d extend parallel to the predetermined direction (Y-axis) towards which the light-emitting element 34 emits the light beam. Furthermore, the apexes 132a of the V-shaped prisms 132 of the optical film 100 extend perpendicularly to the predetermined direction (Y-axis) towards which the light-emitting element 34 emits the light beam.

As mentioned above, the embossed microlenses 122 of the optical film 100 are utilized to concentrate a light beam with a wider viewing angle, and can disperse and haze the light beam with a near perpendicular incident angle. However, the upper and lower side of the liquid crystal display device usually does not require a wide viewing angle. As a means to reduce production cost, the designer can selectively dispose the embossed microlenses on the front surface of the optical film 100.

Figure 6:
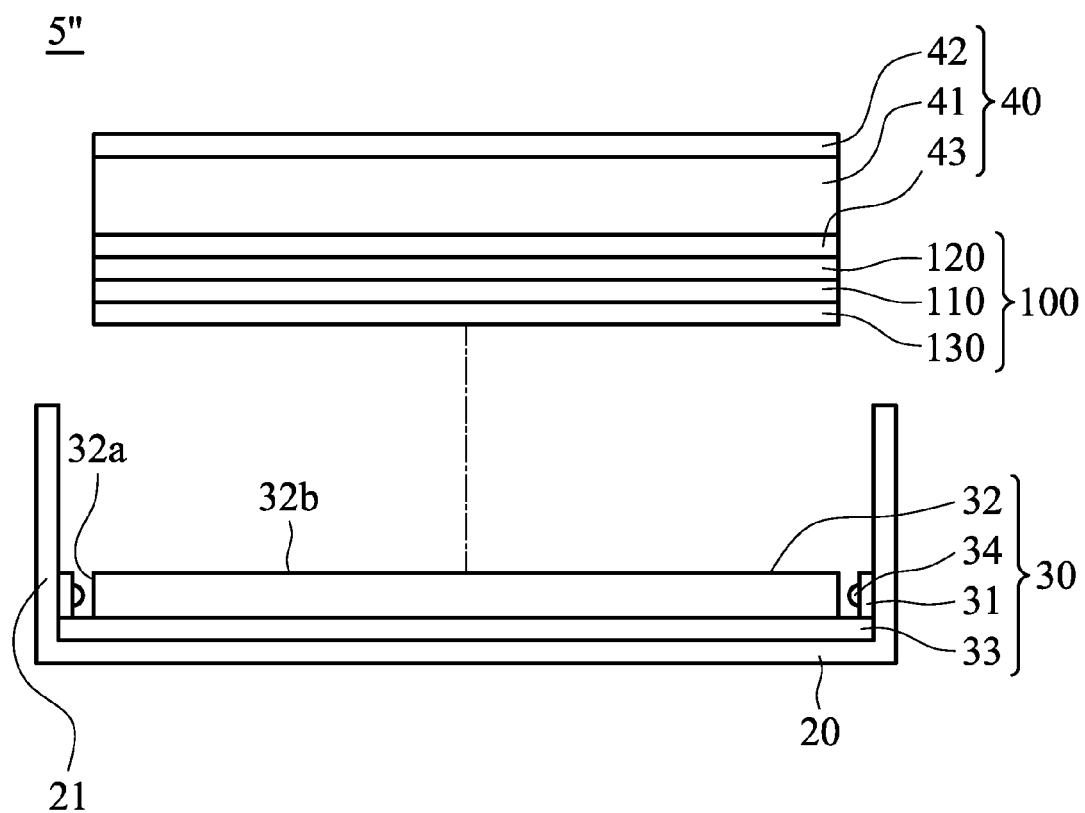
FIG. 6 shows a cross-section diagram of the liquid crystal display device of the third embodiment of the invention.
Figure 7:
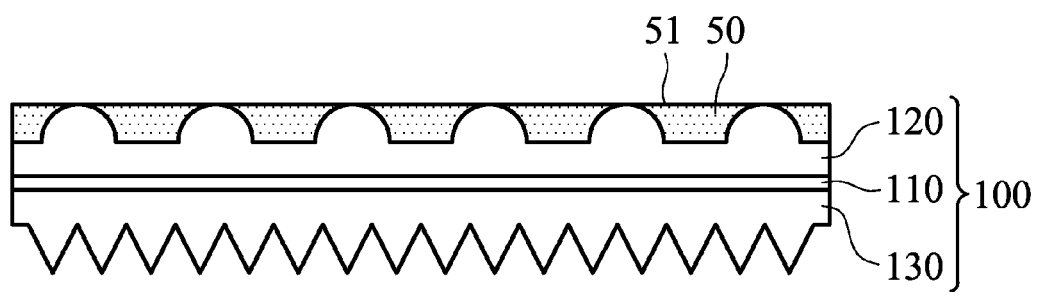
FIG. 7 is a schematic view of partial elements of the third embodiment of this invention.

Please refer to FIGS. 6 and 7. FIG. 6 shows the third embodiment of the liquid crystal display device 5". The liquid crystal display device 5" differs from the liquid crystal display device 5 in that it further includes an adhesive material 50 disposed between the embossed microlenses 122 and forms an adhesive surface 51 away from the substrate 110 to bond the optical film 100 to the lower polarization plate 43. The refractive index of the adhesive material 50 must be smaller than the refractive index of the first transmission medium 120. Because the optical film 100 is directly attached at the liquid crystal panel module 40, the production process of the liquid crystal display device 5' is further simplified.

Figure 8:
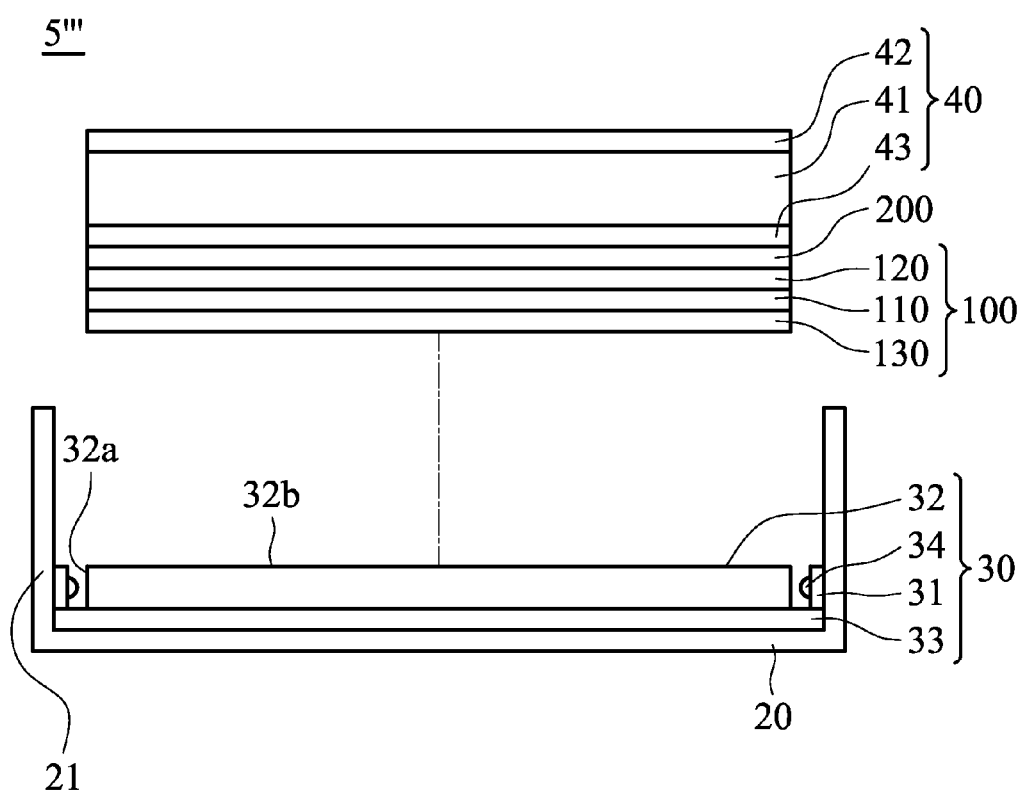
FIG. 8 shows a cross-section diagram of the liquid crystal display device of the fourth embodiment of the invention.

Please refer to FIG. 8, which shows a cross-section diagram of the liquid crystal display device 5''' of the fourth embodiment of the invention. The liquid crystal display device 5''' differs from the liquid crystal display device 5 in that the liquid crystal display device 5''' further includes a reflective polarizing film 200, disposed on the front surface of the first transmission medium 120. That is, the reflective polarizing film 200 is disposed between the lower polarization plate 43 and the first transmission medium 120, wherein the reflective polarizing film 200 includes two or more than two transparent layers in which the transparent layers are alternatively stacked, and each of the transparent layers has a different index of refraction. Due to the arrangement of the reflective polarizing film 200, light with a particular polarization direction is allowed to pass through, and the remaining light is reflected back.

Figure 9:
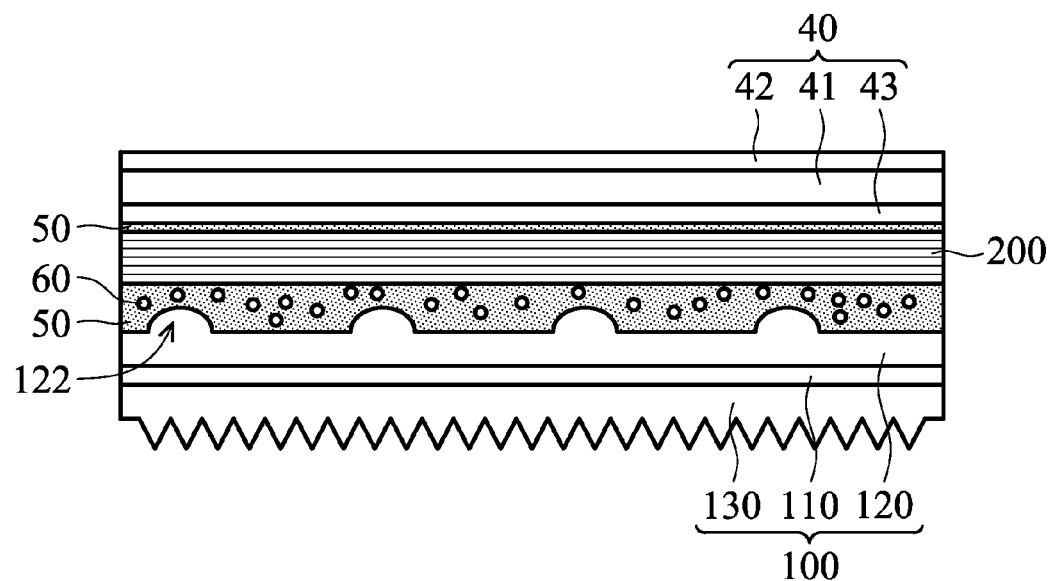
FIGS. 9-11 are schematic views of partial elements of the fourth embodiment of this invention.

As shown in FIG. 9, the reflective polarizing film 200 is connected to the optical film 100 and the liquid crystal panel module 40 via the adhesive material 50, wherein a plurality of dispersion particles 60 are irregularly dispersed inside the adhesive material 50 between the optical film 100 and the reflective polarizing film 200. The diffusion particles 60 allow the light beam to be dispersed and therefore improve the brightness uniformity of the light transmitted from the optical film 100 to the reflective polarizing film 200. Note that the refractive index of the adhesive material 50 must be smaller than the refractive index of the first transmission medium 120.

Figure 10:
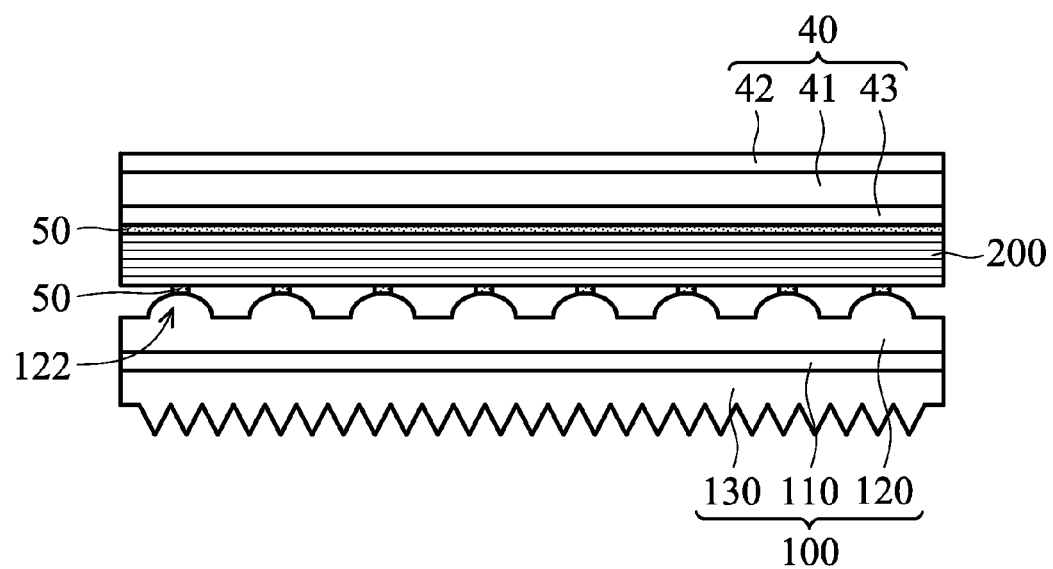
Figure 11:
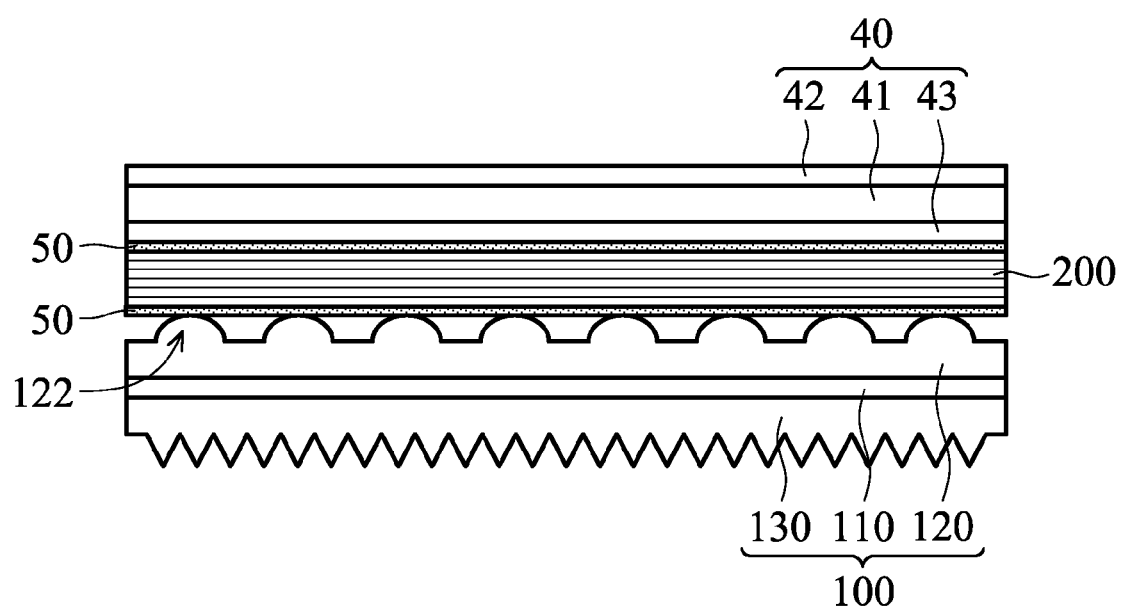

Please refer to FIGS. 10 and 11. The connection relationship of the reflective polarizing film 200 that are connected to the lower polarization plate 43 and the first transmission medium 120 should not be limited by the embodiment shown in FIG. 9. In the embodiment shown in FIG. 10, the adhesive material 50 is disposed on the tops of the embossed microlenses 122 of the first transmission medium 120, thereby the reflective polarizing film 200 is connected to the first transmission medium 120 by the adhesive material 50 which is discontinuously applied thereto. Alternatively, as the embodiment shown in FIG. 11, the adhesive material 50 is disposed on the surface of the reflective polarizing film 200 facing the optical film 100, wherein there is no adhesive material 50 disposed between the embossed microlenses 122 of the first transmission medium 120.

The optical film of the invention improves the shortcomings of the multilayer optical film in the prior art by reducing the number of optical films without sacrificing brightness uniformity.

While the invention has been described by way of example and in terms of embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical film, comprising:
a substrate;
a first transmission medium, disposed at the front surface of the substrate and comprising a plurality of embossed microlenses;
a second transmission medium, disposed at the rear surface of the substrate and comprising a plurality of V-shaped prisms;
a third transmission medium disposed between the first transmission medium and the second transmission medium, wherein the material of the third transmission medium differs from the material of the first and second transmission media, and the refractive index of the third transmission medium is smaller than the refractive index of the second transmission medium;
a reflective polarizing film, disposed at the front surface of the first transmission medium; and
wherein the substrate, the first transmission medium, and the second transmission medium are bounded to each other to form a unitary sheet.

2. The optical film as claimed in claim 1, further comprising a plurality of diffusion particles disposed inside the first and second transmission media.

3. The optical film as claimed in claim 1, wherein the embossed microlenses comprise a plurality of prismatic structures, extending on the surface of the first transmission medium.

4. The optical film as claimed in claim 1, wherein the embossed microlenses comprise a plurality of lenticular structures, extending on the surface of the first transmission medium.

5. A liquid crystal display device, comprising:
a liquid crystal panel module;
a light guide, adjacent to the rear surface of the liquid crystal panel module, having a light incident surface and a light-emitting surface adjacent to the light incident surface;
a light-emitting element, facing the light incident surface of the light guide plate; and
an optical film, disposed at the light-emitting surface of the light guide, or the rear surface of the liquid crystal panel module and comprising:
a substrate;
a first transmission medium disposed at the front surface of the substrate and comprising a plurality of embossed microlenses;
a second transmission medium disposed at the rear surface of the substrate and comprising a plurality of V-shaped prisms;
a third transmission medium disposed between the first transmission medium and the second transmission medium, wherein the material of the third transmission medium differs from the material of the second transmission medium, and the refractive index of the third transmission medium is smaller than the refractive index of the second transmission medium;
a reflective polarizing film, disposed between the liquid crystal panel module and the first transmission medium; and
wherein the substrate, the first transmission medium, and the second transmission medium are bounded to each other to form a unitary sheet.

6. The liquid crystal display device as claimed in claim 5, further comprising a plurality of diffusion particles disposed inside the first transmission medium and the second transmission medium.

7. The liquid crystal display device as claimed in claim 5, wherein the tops of the V-shaped prisms face the light-emitting surface of the light guide plate.

8. The liquid crystal display device as claimed in claim 5, wherein the light-emitting surface comprises a patterned surface formed by a plurality of lenticular projections and the light-emitting element emits light in a predetermined direction, wherein the lenticular bump extends parallel to the predetermined direction.

9. The liquid crystal display device as claimed in claim 8, wherein the V-shaped prisms extend perpendicular to the predetermined direction.

10. The liquid crystal display device as claimed in claim 8, further comprising a frame with two long sides and two short sides adjacent to the two long sides, wherein the light-emitting element is disposed at one of the short sides or at both sides, and the predetermined direction is parallel to the long side.

11. The liquid crystal display device as claimed in claim 5, wherein the embossed microlenses comprise a plurality of prismatic structures, extending on the surface of the first transmission medium.

12. The liquid crystal display device as claimed in claim 5, wherein the embossed microlenses comprise a plurality of lenticular structures, extending on the surface of the first transmission medium.

13. The liquid crystal display device as claimed in claim 5, wherein the reflective polarizing film is connected to the liquid crystal panel module and the first transmission medium via an adhesive material.

* * * * *